Feb. 6, 1968 C. C. WILLIAMSON 3,367,019
METHOD AND APPARATUS FOR MAKING SCRAP BUNDLES
Filed Nov. 17, 1965 3 Sheets-Sheet 1
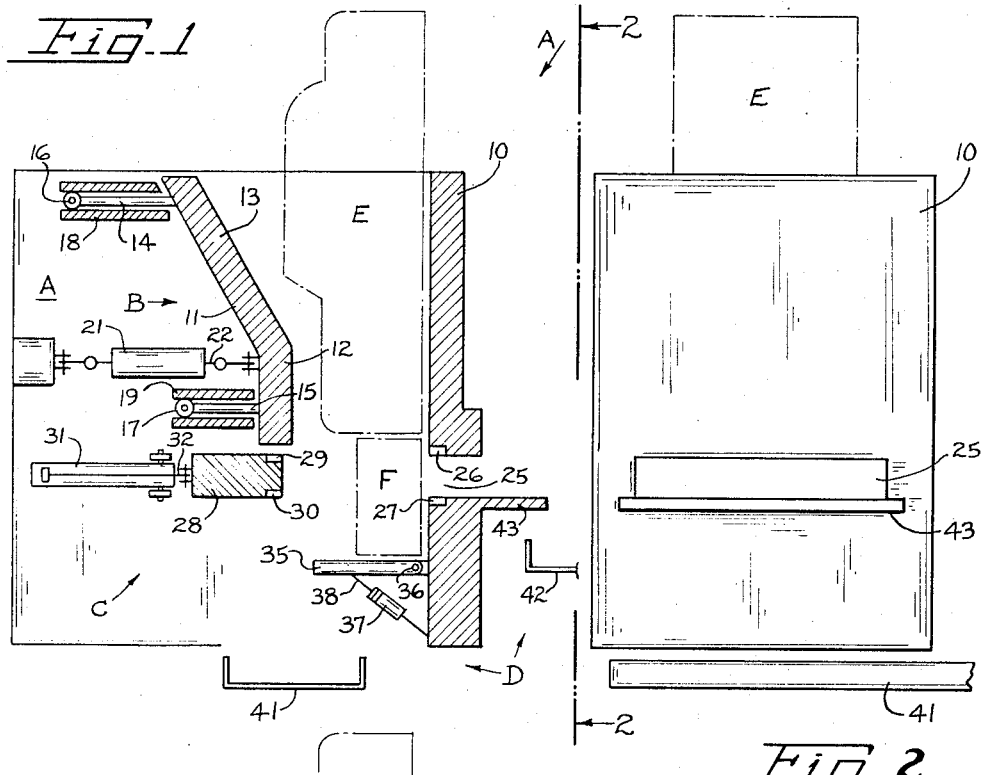
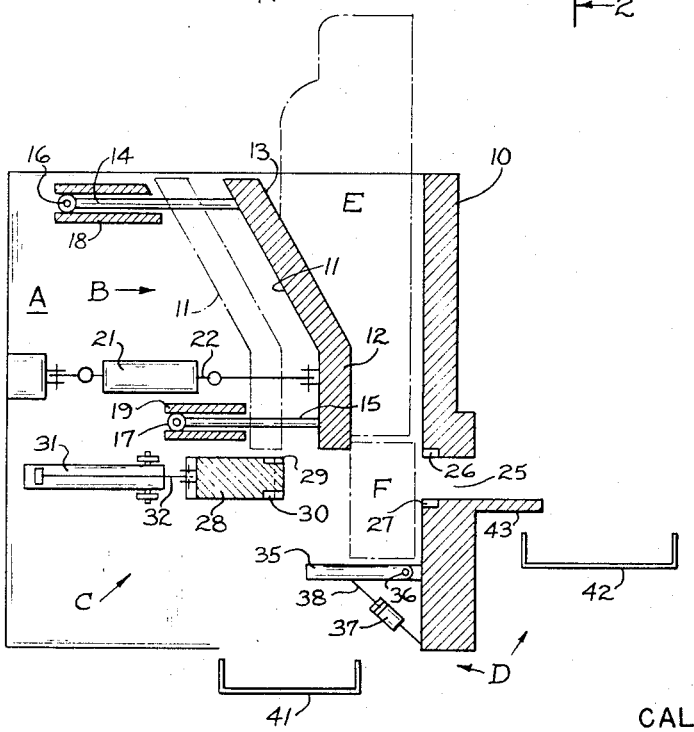
INVENTOR.
CALVIN C. WILLIAMSON
BY
Townsend and Townsend
ATTORNEYS

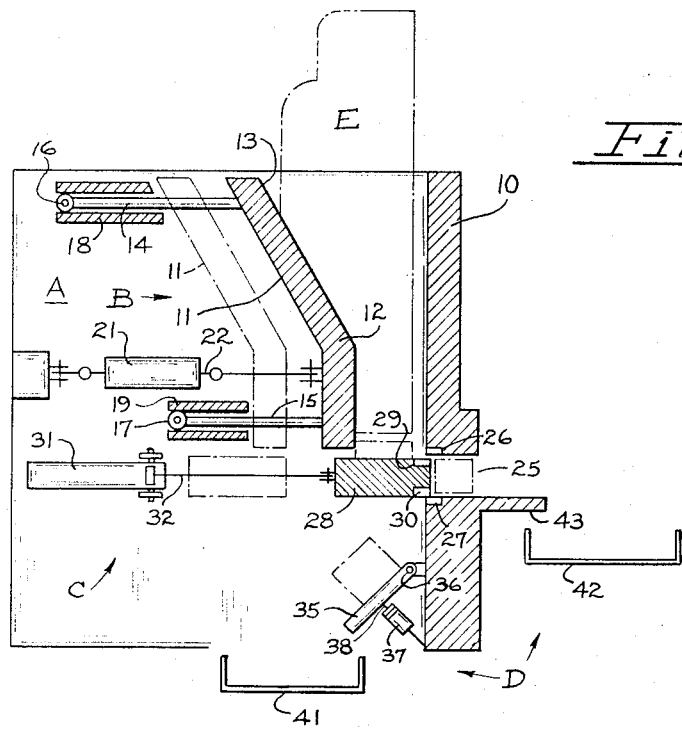
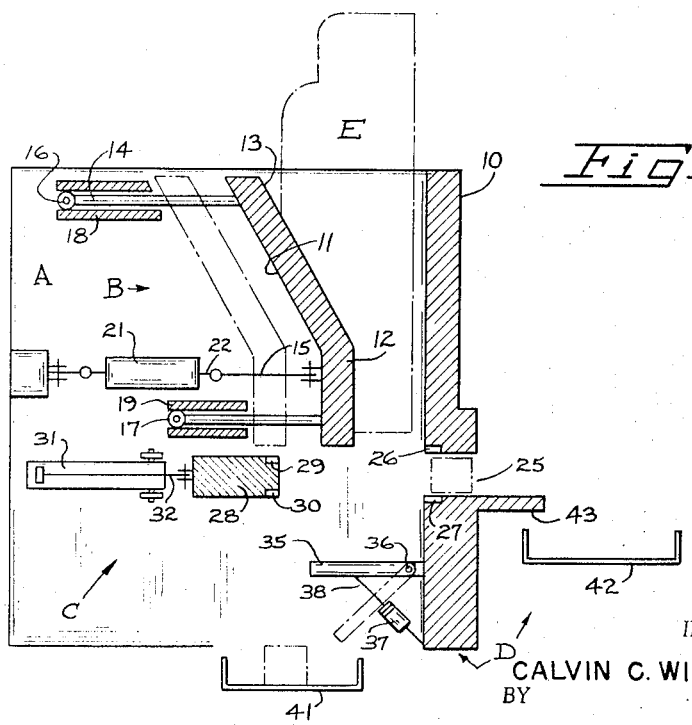

United States Patent Office 3,367,019
Patented Feb. 6, 1968

3,367,019
METHOD AND APPARATUS FOR MAKING
SCRAP BUNDLES
Calvin C. Williamson, San Francisco, Calif., assignor to
Soule Steel Company, San Francisco, Calif.
Substituted for abandoned application Ser. No. 252,666,
Jan. 21, 1963. This application Nov. 17, 1965, Ser. No.
518,501
8 Claims. (Cl. 29—403)

The present invention relates to method and apparatus for making scrap pieces from large frames of scrap material.

A great deal of reclaimable steel exists in the form of scrap material such as junked automobiles. However, the large volume of junked vehicles and the great percentage of non-steel products such as glass, upholstery, etc., contained in these objects makes the cost of reclaiming the steel almost prohibitive. The present invention concerns a portion of a complete scrap steel reclaiming operation in which the bodies of junked automobiles are crushed relatively flat and then sheared into smaller scrap pieces. Then, these pieces are conveyed to a station at which they are again reduced in size by another shear. These reduced pieces are then conveyed to a furnace in which substantially all non-steel material is consumed.

The principal object of the present invention is to provide a method and apparatus for converting large substantially hollow objects consisting mainly of steel into scrap pieces of generally uniform size which can be further processed for removal of undesired materials therein.

One feature and advantage of the present invention lies in the fact that such large hollow objects can be crushed to a workable size whereby the resulting scrap pieces can be easily placed in a furnace for removal of all non-steel materials.

Another object of the present invention is to provide such a method and apparatus utilizing a large crusher wall which has an upwardly and outwardly tapered portion for progressively crushing large hollow objects in sequential steps.

Another feature and advantage of this crushing method and apparatus lies in the fact that large hollow objects can be crushed into a small size without the necessity for a crusher wall movement equal to the difference between the full original height and the crushed height of the object being crushed. Also, the large crusher wall is able to gain certain momentum before the total length of the wall is in contact with the object being crushed.

Another object of this invention is to provide a method and apparatus for sequentially crushing and then shearing into pieces the crushed article.

Another feature and advantage of this crushing and shearing structure and method lies in the fact that the crushing member provides a rigid support for certain of the crushed objects which are to be sheared into smaller pieces.

Still another feature and advantage of this crushing and shearing invention lies in the fact that the step of shearing and apparatus for shearing the crushed articles clears the way for further feeding of newly-crushed material.

Another object of the present invention is to provide method and apparatus for first crushing an object above a shear assembly and then dropping the crushed object to assembly shear bar a distance the width of the shearing bar.

Still another feature and advantage of such a method and apparatus lies in the fact that crushed objects dropped into the shearing portion of the apparatus after the crushing step has been completed will stop against the gate stop and with one stroke of the shear bar at least two scrap pieces of substantially equal size are produced.

Still another object of this invention is to provide a crushing and shearing apparatus which is substantially entirely operated hydraulically so that an entire crushing and shearing operation can be performed hydraulically.

Other objects of the present invention will become apparent on reading the following description and referring to the accompanying drawing in which similar characters of reference represent corresponding parts in each of the several views.

In the drawing:

FIG. 1 is a side vertical sectional view schematically showing the apparatus according to the present invention.

FIG. 2 is an end view of the structure shown in FIG. 1 taken along line 2—2.

FIGS. 3–6 are views similar to FIG. 1 showing the position of the elements of the crushing and shearing structure during sequential steps during the operation of the present invention, the FIG. 1 positions of the crushing and shearing structure being shown in phantom.

Figure 6:
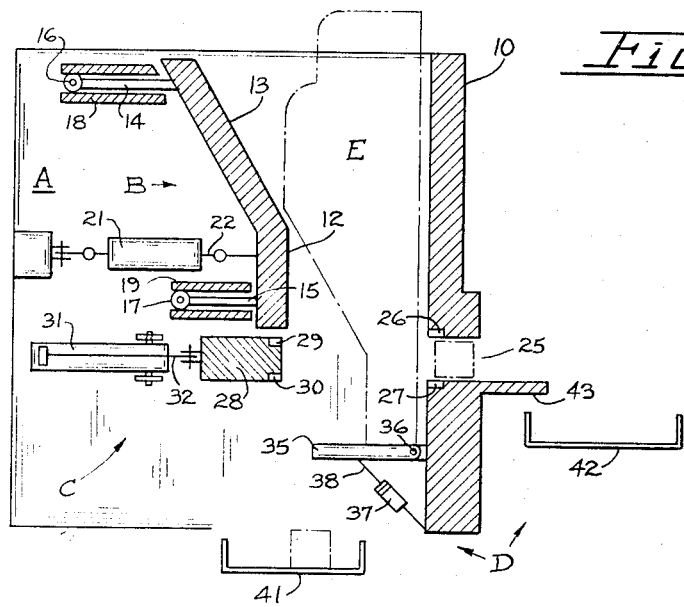

While the present invention will be described as specifically applied to the operation of crushing and shearing junked automobile bodies, it will be evident upon reading the following description that the method and apparatus described are also applicable to other structures.

Referring now to the drawing and especially FIGS. 1 and 2, there is shown an assembly for crushing large substantially hollow objects such as, for example, automobile bodies and structure for cutting up the crushed objects into scrap pieces of generally uniform size which are then further processed for reclaiming the steel from the scrap pieces. A mounting structure A is provided and on which is mounted a crusher assembly B and a shear assembly C mounted therebelow. A conveyor assembly is provided at the bottom of the mounting structure for removing the scrap pieces that leave the shearer assembly C.

The crusher assembly B includes a stationary, substantially vertical, crusher wall 10 and a wide, movable crusher wall 11. The movable crusher wall 11 is provided with a lower substantially vertical portion 12 and an upper tapered portion 13 which is joined to the top of the straight portion 12 and is tapered outwardly away from the opposed stationary crusher wall 10. The movable crusher wall 11 is slidably mounted for horizontal movement toward the stationary crusher wall 10 by means of upper and lower guide arms 14 and 15, each of the guide arms 14 and 15 being provided with guide rollers 16 and 17, respectively, which ride on roller rails 18 and 19 secured to the mounting structure A. The movable crusher wall 11 is actuated by several hydraulic cylinders 21 supported on the mounting structure A, one of the cylinders 21 being shown with the outer end of its piston rod 22 pivotally secured to the movable crusher wall 11.

A horizontal shear opening 25 is provided in the vertical crusher wall 10 below the crusher assembly, and the wall 10 is provided at the top and bottom edges of the opening 25 with stationary shear blades 26 and 27 respectively. Positioned below the movable crusher wall 11 and slightly further from the stationary crusher wall 10 is an elongate movable shear bar 28 provided along its top and bottom surfaces with shear blades 29 and 30. The moving shear bar 28 is supported on the mounting structure A for horizontal movement toward the shear opening 25 by means of several hydraulic cylinders 31 one of which is shown supported on the mounting structure and with the piston rod 32 thereof secured to the shear bar 28. Upon actuation of the hydraulic cylinders 31, the moving shear bar 32 is moved horizontally until the shear blades 29 and 30 are respectively positioned adjacent the stationary shear blades 26 and 27 to shear any material positioned therebetween. The sheared portion of the material positioned between stationary blades 26 and 27 is forced through the opening 25 in the stationary crusher wall 10.

A flat gate stop 35 is rotatably mounted on the stationary crusher wall 10 below the shear opening 25 by means of a horizontal mounting pin 36, and below the gate stop 35 one end of an actuating hydraulic cylinder 37 is pivotally mounted on the stationary crusher wall 10 with the piston rod 38 projecting from the other end thereof pivotally mounted on the under side of the gate stop 35 for moving the gate stop from a horizontal position to a downwardly inclined position.

Air-operated conveyors 41 and 42 are positioned below the gate stop 35 and a shelf 43 projecting outwardly from below the shear opening 25 for carrying away the scrap bundles produced in the crushing and shearing apparatus. These air-operated conveyors are of the type described in my copending application entitled "conveying method and apparatus" filed the same day as the present application.

In operation of the present invention as shown in FIGS. 1–6, a junked automobile is fed vertically into the crusher assembly B and comes to rest upon the crushed portion F of the auto body crushed in the previous operation. The auto body is preferably positioned in the crusher assembly with the floor of the auto body adjacent the stationary crusher wall 10 so that the movable crusher wall 11 gains momentum in the space remaining in the crusher assembly and the auto body is progressively crushed by the tapered portion of the movable crusher wall 11. The hydraulic cylinders 21 are actuated to move the movable crusher wall 11 toward the stationary crusher wall 10 thereby crushing the auto body E. Then the hydraulic cylinder 31 which is actuated concurrently with the crusher wall cylinder 21 drives the moving shear bar 28 against the crushed portion F, shearing the crushed portion F along the lines between the upper shear blades 27 and 29 and the lower shear blades 28 and 30. The sheared piece of the crushed portion F lying between the upper and lower shear blades is pushed through the shear opening 25 toward the conveyor 42, and the gate stop 35 is dropped from its horizontal position to allow the remaining piece of the crushed portion F positioned thereon to drop onto the cnveyor 41. The gate stop is positioned below the shear opening a distance approximately equal to the vertical width of the shear opening 25 so that the crushed piece positioned on the gate stop 35 after operation of the shear bar 28 is substantially the same size as the piece pushed through the shear opening 25.

Since during the shearing operation the crusher wall 11 leads the shear bar 28, the movable crusher wall 11 holds the upper end of the crushed material being sheared against the stationary crusher wall 10.

As shown in FIG. 4, the shear bar 28 is then retracted to its initial position and the gate stop 35 brought back up to horizontal position while the movable crusher door 11 still holds the crushed body against the stationary crusher door 10. Then, as shown in FIG. 6, the movable crusher door 11 is brought back to its initial position and the crushed body is dropped onto the stop gate 35 and the cycle repeated.

As is clear from the drawing and the description thus far, the tapered portion 13 of the movable crusher wall 11 permits feeding into the crusher assembly larger structures than the opening between the straight portion 12 of the movable crusher wall 11 and the stationary crusher wall 10. This enables the movement of the movable crusher wall 11 to be of a limited distance. While the tapered portion 13 is shown as part of the movable crusher wall 11, it is obvious that the movable crusher wall could be entirely straight and the tapered portion provided on the stationary crusher wall. However, this latter structure would have a tendency to funnel all of the material inserted into the crusher assembly B up against the movable crusher wall 11 when the movable wall is backed up to its initial position for starting the cycle. By the structure shown, the movable wall is able to gain some momentum before applying the crushing force to the scrap auto body.

While these and other details have been shown by way of illustration and example for the purpose of clarity and understanding, it is understood that certain changes and modifications can be made within the spirit of the invention as limited by the scope of the appended claims.

What is claimed is:

1. Apparatus for crushing large substantially hollow objects into compact scrap pieces of generally uniform cross-section comprising: a mounting structure; a stationary crusher wall supported on said mounting structure; a movable crusher wall slidably mounted on said mounting structure; and hydraulic means mounted on said mounting structure for forcibly moving said movable crusher wall toward said stationary crusher wall with all portions of said movable crusher wall moving through the same distance to crush objects positioned between said crusher walls, one of said crusher walls provided with an outwardly and upwardly tapered portion which tapers in a direction away from the opposite crusher wall.

2. The apparatus of claim 1 provided with an article shearing apparatus positioned below said crushing structure including: a pair of vertically spaced-apart stationary shear blades mounted on said mounting structure; a shear bar; a pair of shear blades secured to said shear bar and spaced apart by a distance substantially equal to the space between said stationary shear blades; means for supporting said shear bar on said mounting structure with the shear bar shear blades aligned with said stationary shear blades; and hydarulic means for forcibly driving said shear bar toward said stationary wall to a position in which said shear bar shear blades are positioned adjacent said stationary shear blades to shear objects initially positioned therebetween.

3. The apparatus of claim 2 provided with a stop gate positioned vertically below the lower of said stationary shear blades, means rotatably mounting said stop gate a distance below the lower of said stationary shear blades substantially equal to the space between said stationary shear blades and means for moving said stop gate from a substantially horizontal position to a downwardly inclined position.

4. Apparatus for converting substantially hollow objects into scrap pieces of generally uniform size, comprising: a mounting structure; a vertical, stationary crusher wall mounted on said mounting structure; a movable crusher wall; means for slidably mounting said movable crusher wall on said mounting structure; hydraulic means for forcibly driving said movable crusher wall toward said stationary crusher wall; said movable crusher wall having a lower substantially vertical portion and an upper tapered portion, said tapered portion tapering from said vertical portion upwardly and outwardly away from said stationary crusher wall; said crusher wall provided with a shear opening; upper and lower stationary shear blades positioned at the edges of said shear opening; a substantially horizontal shear bar having upper and lower shear blades thereon, said upper and lower shear bar shear blades being substantially horizontally aligned with said upper and lower stationary shear blades; hydraulic means for driving said shear bar from an open position spaced from said stationary crusher wall to a closed position with the upper and lower shear bar shear blades positioned substantially adjacent to the upper and lower stationary shear blades; a gate stop; means rotatably supporting said gate stop vertically below said shear opening a distance substantially equal to the width of said shear opening; and means for moving said stop gate from a substantially horizontal position to a downwardly inclined position.

5. Apparatus for converting large, substantially hollow objects into scrap pieces of generally uniform size comprising: a mounting structure; a stationary crusher wall supported on said mounting structure; a movable crusher wall slidably mounted on said mounting structure; hydraulic means mounted on said mounting structure for forcibly moving said movable crusher wall toward said stationary crusher wall to crush objects positioned therebetween; such stationary crusher wall provided with a shear opening; a pair of vertically spaced apart stationary shearing blades positioned along the edges of said shear opening; a shear bar; a pair of shear blades secured to said shear bar and spaced apart by a distance substantially equal to the space between said stationary shear blades; means for supporting said shear bar on said mounting structure with the shear bar shear blades aligned with said stationary shear blades; and hydraulic means for forcibly driving said shear bar toward said stationary wall to a position in which said shear bar shear blades are positioned adjacent said stationary shear blades to shear objects initially positioned therebetween.

6. Apparatus for crushing large, substantially hollow objects into compact scrap pieces of generally uniform cross-section comprising: a mounting structure; a vertical, stationary crusher wall mounted on said mounting structure; a movable crusher wall; means for slidably mounting said movable crusher wall on said mounting structure; and hydraulic means for forcibly driving said movable crusher wall toward said stationary crusher wall; said movable crusher wall having a lower substantially vertical portion and an upper tapered portion, said tapered portion tapered from said vertical portion upwardly and outwardly away from said stationary crusher wall and all portions of said movable crusher wall moving through the same distance.

7. A method of converting substantially hollow objects into scrap pieces of generally uniform size comprising the steps of: feeding an object to be crushed vertically downward; applying a horizontal crushing force against said object; the crushing force including a lower crushing force applied to a lower portion of the object along a substantially vertical distance; and an upper crushing force applied above said lower crushing force along a line at an angle to the vertical and directed away from the object; lowering the crushed object to a stop gate position below the crushing apparatus; reapplying a horizontal crushing force against a portion of the object then positioned in the crushing apparatus; and applying a substantially horizontal shearing force against said crushed object above said stop gate and below said crushing apparatus to shear said crushed portion into small crushed pieces.

8. The method of converting substantially hollow objects into scrap pieces of generally uniform size comprising the steps of: feeding an object to be crushed vertically downward into a crushing apparatus; applying a horizontal crushing force against said object; said crushing force including a lower crushing force applied to a lower portion of the object along a substantially vertical distance; and an upper crushing force applied above said lower crushing force along a line at an angle to the vertical and directed away from the object; lowering the crushed object to a stop gate; and applying a substantially horizontal shearing force against said crushed object above said stop gate to shear said crushed portion into small crushed pieces.

References Cited

UNITED STATES PATENTS

| | | | |
|---|---|---|---|
| 2,362,701 | 11/1944 | Koehring | 29—34 |
| 2,865,284 | 12/1958 | Thompson et al. | 100—232 |
| 2,920,554 | 1/1960 | Bunke | 100—179 |

THOMAS H. EAGER, *Primary Examiner.*